United States Patent
Feltman

[11] Patent Number: 6,067,691
[45] Date of Patent: May 30, 2000

[54] ADJUSTABLE CLIP FOR ATTACHING SHEET MATERIAL TO STRUCTURAL MEMBERS

[76] Inventor: Jeffrey L. Feltman, 221 Phoenix St., Vernon, Conn. 06066

[21] Appl. No.: 09/072,930

[22] Filed: May 5, 1998

[51] Int. Cl.[7] .................. E04C 3/30; E04C 5/00
[52] U.S. Cl. .................. 24/295; 52/714; 24/336; 24/563
[58] Field of Search .................. 24/295, 336, 555, 24/545, 562, 546; 52/712, 713, 714, 489.1, 481.2, 698, 749.1

[56] References Cited

U.S. PATENT DOCUMENTS

| | | | |
|---|---|---|---|
| 1,425,089 | 8/1922 | Henry | 24/336 X |
| 3,019,954 | 2/1962 | Faltin | 24/336 X |
| 3,231,076 | 1/1966 | Freiman | 24/336 X |
| 3,516,389 | 6/1970 | Meyer | 24/336 X |
| 3,626,553 | 12/1971 | Darney et al. | 24/336 X |
| 3,748,815 | 7/1973 | Parker | 24/336 X |
| 3,815,309 | 6/1974 | Olsen | 52/714 X |
| 4,377,060 | 3/1983 | Ragland | 52/714 X |
| 4,471,593 | 9/1984 | Ragland | 52/714 X |
| 4,621,473 | 11/1986 | Wendt | 52/714 X |
| 5,101,540 | 4/1992 | Roof et al. | 24/295 X |
| 5,384,938 | 1/1995 | Frederick | 24/563 X |
| 5,509,634 | 4/1996 | Gebka et al. | 24/336 X |

FOREIGN PATENT DOCUMENTS

| | | | |
|---|---|---|---|
| 209160 | 8/1954 | Australia | 24/336 |
| 165106 | 1/1934 | Switzerland | 24/336 |

*Primary Examiner*—James R. Brittain
*Assistant Examiner*—Robert J. Sandy
*Attorney, Agent, or Firm*—Cummings & Lockwood

[57] ABSTRACT

A clip for facilitating attachment of sheet material to structural beams includes a clip body portion and an adjustable spring arm portion allowing the clip to be adjusted to fit on structural beams of different sizes. The clip body portion includes a first mounting surface and a second mounting surface. The adjustable arm portion includes a first arm panel defining an additional sheet-mounting surface and a second arm panel movable with respect to the first arm panel within a range of up to the width of the first arm panel. The additional mounting surface is substantially parallel to the first mounting surface of the clip body and provides greater mounting and support surface for the sheet material.

14 Claims, 2 Drawing Sheets

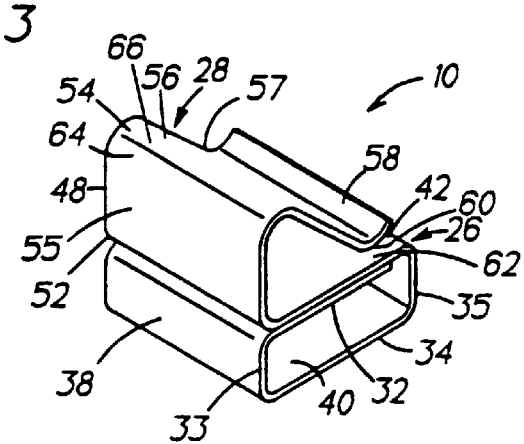
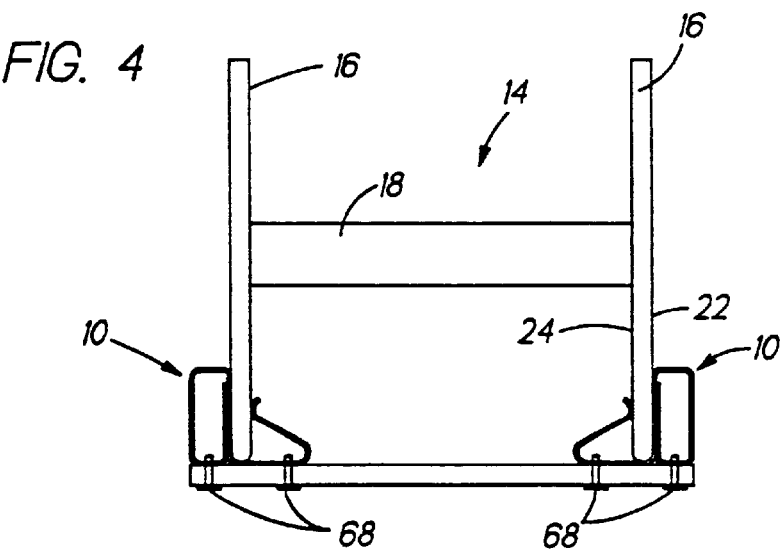
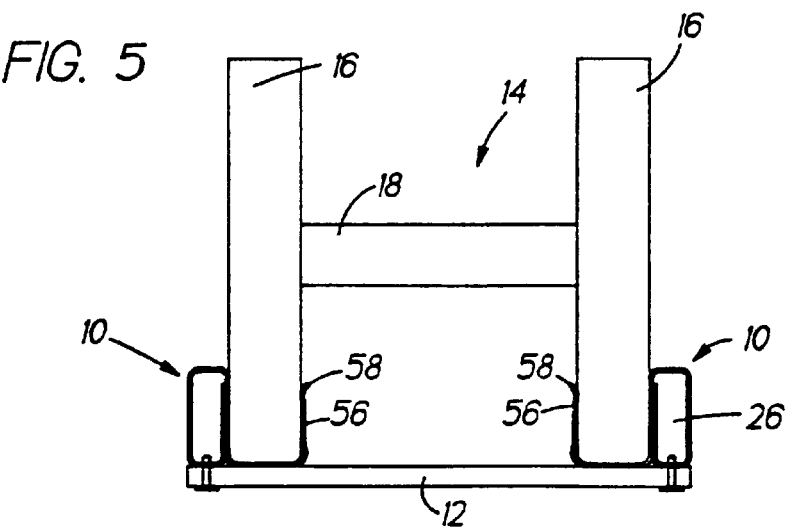

ADJUSTABLE CLIP FOR ATTACHING SHEET MATERIAL TO STRUCTURAL MEMBERS

BACKGROUND OF THE INVENTION

1. Technical Field

The present invention relates to fasteners used in construction and, more particularly, to clips facilitating attachment of sheet material to structural members.

2. Background Art

During construction of various commercial and residential buildings, a sheet material, such as sheet rock, must be secured to steel structural members. The existing practice is a rather involved procedure and dictates that a frame be built around each steel structural member. The frame typically comprises a plurality of steel studs that need to be secured to the structural member and plumbed with respect to each other. The sheet rock and other construction materials, such as insulation or fire protective material, are then attached to the frame. The current procedure is not only labor intensive resulting in high labor costs, but also requires large quantities of expensive material for erecting the frames.

One alternative to existing practice was disclosed in the U.S. Pat. No. 3,748,815 entitled "PLASTERBOARD TO COLUMN CLIP" and issued to Parker. The patent teaches a clip having a box with rectangular cross-section and a flap. The box provides attaching surfaces for screws and the flap fits onto a respective flange of an I-beam. The clip recited in the Parker patent accommodates only a particular size of the I-beam flange or like structural member. However, in the building industry, I-beams and like structural members are provided with a variety of flange thicknesses. In order for the clip of the Parker patent to accommodate these various flange thicknesses, clips with different corresponding dimensions must be used. This is not a practical alternative to the existing practice for a number of reasons. First, clips of various sizes would need to be manufactured and/or purchased and accounted. Second, the proper sized clips would have to be matched to the structural members of the corresponding size. Third, the clips disclosed in the above-identified patent cannot be used with I-beam flanges that are substantially thinner than the span between the flap and the body. As a result of these drawbacks, the clips have not gained popularity in the construction industry.

SUMMARY OF THE INVENTION

It is an object of the present invention to provide an improved structural member clip for facilitating attachment of sheet material to structural members during construction.

It is a further object of the present invention to provide an adjustable structural member clip to accommodate various widths of flanges of structural members.

According to the present invention, a clip for facilitating attachment of drywall, sheet rock or other sheet material to I-beams or other structural members includes a clip body portion providing first and second mounting surfaces for attaching the sheet material and an adjustable spring arm portion for attaching the clip to the structural member. The spring arm portion includes a first arm panel defining an additional mounting surface for securing the sheet material thereto. The first arm panel is substantially co-planar with the first mounting surface of the clip body portion. The spring arm portion further includes a second arm panel integrally formed with the first arm panel and a lip portion protruding outwardly from a distal end of the spring arm portion. The spring arm portion can be secured to structural members of various thicknesses within the range defined by the width of the forming the first arm portion additional mounting surface.

One advantage of the present invention is that the clip can be used with I-beams or like structural members of various sizes.

Another advantage of the present invention is that the first arm panel of the spring arm provides an additional mounting surface for fasteners and additional surfaces are for supporting the sheet material, as well as increases the strength of the clip.

The foregoing and other advantages of the present invention become more apparent in light of the following detailed description of the exemplary embodiment thereof, as illustrated in the accompanying drawings.

BRIEF DESCRIPTION OF THE DRAWINGS

FIG. 3 is an enlarged, perspective view of the clip of FIG. 2, according to the present invention;

FIG. 4 is a top plan view of a plurality of clips of the invention securing sheet material onto an I-beam or like structural member having a relatively thin flange; and FIG. 5 is a top plan view of a plurality of clips of the invention securing sheet material onto an I-beam or like structural member having a relatively thick flange.

DETAILED DESCRIPTION OF THE INVENTION

Figure 1:
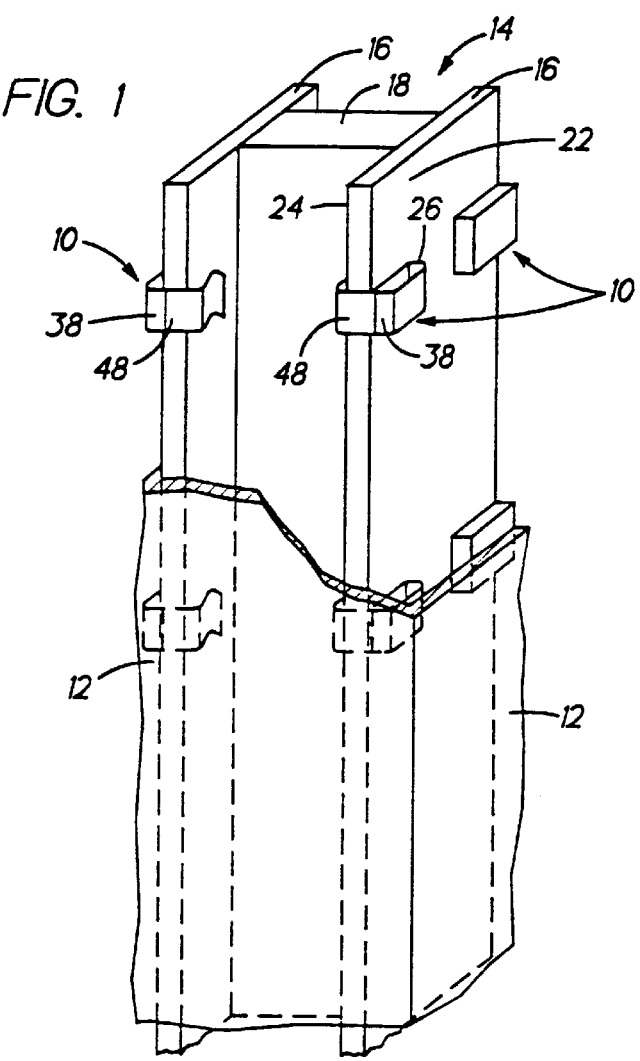
FIG. 1 is a partially cut away, perspective view of an I-beam with a plurality of clips embodying the invention and securing drywall, sheet rock or like sheet material thereto.
Figure 2:
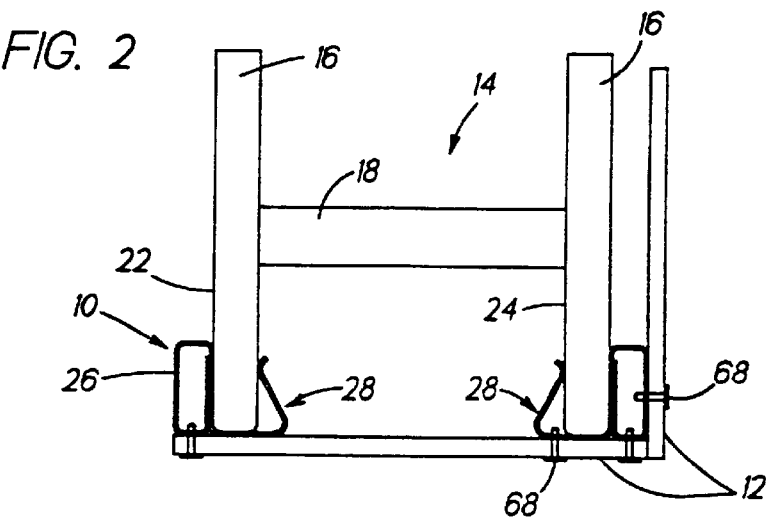
FIG. 2 is a top plan view of the I-beam of FIG. 2 with the plurality of clips securing the sheet material thereto.

Referring to FIGS. 1 and 2, a plurality of clips 10 secure sheet material 12 to a structural member 14. The I-beam structural member 14 includes a pair of flanges 16 spaced apart and connected by a web 18. Each flange 16 has an outside surface 22 and an inside surface 24.

Referring to FIG. 3, each clip 10 includes a clip body portion 26 and an adjustable spring arm portion 28 projecting from the clip body portion 26. The clip body portion 26 includes a plurality of body panels 32–35 defining a substantially rectangular cross-section with the body panel 33 defining a first mounting surface 38 and body panel 34, substantially perpendicular to the body panel 33, defining a second mounting surface 40. The body panel 33 defines a clip body engaging surface 42.

The adjustable spring arm portion 28 is integrally formed with the clip body portion 26 and defines an arm cavity 46 therein. The adjustable spring arm portion 28 includes a first arm panel 48, disposed between a bend 52 and an elbow 54, to define an additional mounting surface 55. The first arm panel 48 is substantially planar and is disposed in a plane substantially parallel to the plane of the first mounting surface 38. The additional mounting surface 55 has a width associated with it, defined to extend between the bend 52 and the elbow 54. As shown in FIG. 3, the width of the additional mounting surface 55 is at least that of the first mounting surface 38.

The spring arm portion 28 further includes a second arm panel 56 integrally formed with the first arm panel 48 and separated therefrom by the elbow 54. The second arm panel 56 is also substantially planar and has a second arm panel width defined between the elbow 54 and a distal end 57 of the second arm panel. The second arm panel width substantially equals the first arm panel width. An adjusting lip or upturned portion 58 is integrally formed on the distal end 57 of the second arm panel 56 to define an arm engaging surface 60, disposed across the body engaging surface 42 and forming a gap 62.

The first arm panel 48 and the second arm panel 56 define a substantially planar first and second corner regions 64, 66, respectively, and a line of bending formed between the first and second planar corner regions at the elbow 54. As shown in FIG. 3, first and second corner regions 64, 66 form an acute angle relative to each other at the elbow 54 that can be adjusted by moving the second corner region 66 with respect to the first corner region 64 about the line of bending defined at the elbow 54. The second arm panel 56 and consequently the second corner region 66 are moved when the lip 58 is moved relative to the clip body portion 26. The lip 58 can be moved through the range of widths substantially equaling the width of the first arm panel 38, thereby varying the angle at the elbow 54.

In operation, a plurality of clips 10 is attached to the structural member 14, for example an I-beam, as shown in FIGS. 1 and 2. In the preferred embodiment, four clips 10 are spaced apart from each other and attached to each flange 16 of the structural member 14. Each clip 10 is attached to the flange 16 of the I-beam 14 such that the flange 16 fits into the cavity 46 of the clip with the body engaging surface 42 and the arm engaging surface 60 engaging the outside and inside surfaces 22, 24 of the flange 16, respectively. The adjustable spring arm portion 28 of the clip 10 functions as an adjustable spring arm to accommodate flanges 16 ranging in thickness from very thin up to the width of the first arm panel 48, as shown in FIGS. 4 and 5. The spring arm 28 is adjusted by gripping and moving the lip 58 to vary the angle between the first corner region 64 and the second corner region 66 to thereby adjust and set the width of the gap 62 to correspond to the flange width of a selected I-beam or other structural member. The lip 58 is movable throughout the range of widths of up to the width of the first arm panel 48. The width of the second arm panel 56 ensures that the very thin flanges 16 of the beam 14 can be also accommodated, as shown in FIG. 4.

In the preferred embodiment of the present invention, the width of the first arm panel 48 is approximately one and a half of an inch (1.5"). The width of the second arm panel 56 approximately equals the width of the first arm panel 48. To optimize adjustability of the clip, the width of the second arm panel 56 should equal at least approximately seventy-five percent (75%) of the width of the first arm panel 48. With the first arm panel and the second arm panel having essentially the same width, the spring arm can be adjusted such that the gap 62 is essentially closed and the lip 58 can be moved into close proximity with the body engaging surface 42. The lip 58 also can be moved to form the gap 62 approximately equaling the first arm panel width. With these dimensions, the clip 10 can accommodate beam flanges 16 varying in thickness from one eighth of an inch (⅛") to one and a half of an inch (1.5").

Once the clips 10 are secured to the structural member 14, the sheet material 12 is then attached to the clips 10. Each sheet of material 12 is placed against the first mounting surface 38 and the additional mounting surface 48 and secured thereto by putting fasteners 68 through the sheet material 12 and through the mounting surfaces 38, 48, as best seen in FIG. 2. Another sheet material 12 can be attached to second mounting surfaces 40 to completely enclose the beam 14. The additional mounting surface 55 of the clip 10 of the present invention provides additional support and stability for the sheet material 12.

The adjustable spring arm portion 28 also improves the strength of the clip 10. The relatively wide first arm panel 48 and the elbow 54 provide additional stiffness and sturdiness to the spring arm portion 28. The elbow 54 is sufficiently stiff to apply spring pressure to the flange 16 of the I-beam 14 ensuring tight attachment thereto and sufficiently flexible to be adjusted to accommodate various thicknesses of structural member flanges 16.

One advantage of the present invention is that the clips are adjustable and one size clip can fit and be used with structural members of various sizes. This advantage is extremely crucial for the construction industry because it eliminates the necessity of having numerous clips of different sizes and avoiding confusion as, to which particular clip size fits on which structural member.

Another advantage of the present invention is that the clip is adjusted easily. The particular configuration of the clip 10 having the lip 58 disposed on the end of the substantially planar second arm panel 56 movable with respect to the substantially planar first arm panel allows one to adjust the clip easily and quickly.

A further advantage of the present invention is that the substantially planar first and second arm panels 48, 56 with the elbow 54 therebetween provide additional stability and strength to the clip 10 itself.

While the present invention has been illustrated and described with respect to a particular embodiment thereof, it should be appreciated by those of ordinary skill in the art, that various modifications to this invention may be made without departing from the spirit and scope of the present invention.

I claim:

1. An adjustable clip for mounting sheet material to any of a plurality of different structural members, each of the plurality of different structural members having any of a plurality of different thicknesses throughout a range of thicknesses, said clip comprising:

a body having an approximately rectangular cross section defined by four approximately planar side walls, wherein a first side wall forms a first body panel defining a first approximately planar sheet-mounting surface having a width for mounting sheet material thereon, and a second side wall defines a body engaging surface engagable with any of said structural members; and a spring arm projecting laterally from said body including a first arm panel defining an additional approximately planar sheet-mounting surface substantially located within a plane approximately parallel to the plane of said first approximately planar sheet-mounting surface, said first arm panel having a first arm panel width equal to at least the width of the first approximately planar sheet-mounting surface;

said spring arm including a second arm panel having a second arm panel width equal to at least seventy-five percent (75%) of said first arm panel width;

said second arm panel including a distal end having an arm engaging surface engagable with any of said structural members, and an upturned portion turning upwardly and approximately away from the body engaging surface of the body to facilitate gripping and adjustment of the position of the arm engaging surface relative to the body engaging surface, said arm engaging surface being movable relative to said body engaging surface to define any of a plurality of different width gaps between said arm engaging surface and said body engaging surface, wherein the plurality of different width gaps define a range of widths at least equal to said first arm panel width;

said first arm panel defining a first approximately planar corner region;

said second arm panel defining a second approximately planar corner region with a line of bending formed between said first and second planar corner regions, and said second corner region and respective second arm panel being oriented at an acute angle relative to said first corner region and respective first arm panel;

said second corner region being movable relative to said first corner region about said line of bending to correspondingly adjust said angle defined between said first and second corner regions and set said arm engaging surface relative to said body engaging surface to define any of a plurality of different width gaps between said arm engaging surface and said body engaging surface corresponding to the plurality of thicknesses of the structural members, wherein the plurality of different width gaps define a range of widths at least equal said first arm panel width.

2. The clip according to claim 1 wherein said second arm panel width equals approximately said first arm panel width.

3. A clip as defined in claim 1, wherein the first arm panel of the spring arm defines a first approximately planar surface forming both the approximately planar sheet-mounting surface and the first approximately planar corner region of the first arm panel, and the second arm panel of the spring arm includes an approximately planar surface forming the second approximately planar corner region and extending from the line of bending to the upturned portion on the distal end thereof.

4. The clip according to claim 1 wherein said body further comprises a second mounting surface substantially perpendicular to said first mounting surface.

5. The clip according to claim 1 wherein said first arm panel width is at least one inch.

6. The clip according to claim 1 wherein said first arm panel width is approximately one and a half of an inch.

7. The clip according to claim 1 wherein said second arm panel is substantially planar.

8. An adjustable clip for mounting sheet material to any of a plurality of different structural members, each of the plurality of different structural members having any of a plurality of different thicknesses throughout a range of thicknesses, said clip comprising:

a body having an approximately rectangular cross section defined by four approximately planar side walls, wherein a first side wall forms a first body panel defining a first approximately planar sheet-mounting surface having a width for mounting sheet material thereon, and a second side wall defines a body engaging surface engagable with any of said structural members;

a spring arm projecting laterally from said body including a first arm panel defining an additional approximately planar sheet-mounting surface substantially located within a plane approximately parallel to the plane of said first approximately planar sheet-mounting surface, said first arm panel having a first arm panel width equal to at least the width of the first approximately planar sheet-mounting surface, said spring arm including a second arm panel having a second arm panel width equal to at least seventy-five percent (75%) of said first arm panel width, said second arm panel including a second approximately planar surface and a distal end located on an opposite side of the second planar surface relative to the first planar sheet-mounting surface and oriented at an acute angle relative to the first planar sheet-mounting surface, said distal end having an arm engaging surface spaced relative to said body engaging surface and defining a gap therebetween for receiving and engaging any of said structural members with said arm and body engaging surfaces, and said distal end further defining an upturned portion turning upwardly and approximately away from the body engaging surface; and means for permitting said arm engaging surface to move relative to said body engaging surface for adjusting the angle between the first approximately planar sheet-mounting surface and the second approximately planar surface and setting the width of the gap at any of a plurality of different widths throughout a range of widths approximately equal said first arm panel width, and corresponding to any of the thicknesses of the structural members.

9. A clip as defined in claim 8, wherein the second arm panel is approximately planar.

10. The clip according to claim 8 wherein said means for permitting said arm engaging surface to move relative to said body engaging surface for adjusting the angle between the first approximately planar sheet-mounting surface and the second approximately planar surface, further comprises:

a first approximately planar corner region defined on said first arm panel; and a second approximately planar corner region defined on said second arm panel with a line of bending formed between said first and second planar corner regions;

said second corner region being movable relative to said first corner region about said line of bending.

11. The clip according to claim 10 wherein said body defines a second mounting surface substantially perpendicular to said first mounting surface.

12. A clip as defined in claim 8, wherein the first arm panel width is between approximately 1.0 and 1.5 inch.

13. A clip as defined in claim 10, wherein the first arm panel of the spring arm defines a first approximately planar surface forming both the approximately planar sheet-mounting surface and the first approximately planar corner region of the first arm panel, and the second arm panel of the spring arm includes an approximately planar surface forming the second approximately planar corner region and extending from the line of bending to the upturned portion on the distal end thereof.

14. A clip as defined in claim 8, wherein the second arm panel width is approximately equal to the width of the first arm panel.

\* \* \* \* \*

UNITED STATES PATENT AND TRADEMARK OFFICE
CERTIFICATE OF CORRECTION

PATENT NO. : 6,067,691
DATED : May 30, 2000
INVENTOR(S) : Jeffrey L. Feltman

It is certified that error appears in the above-identified patent and that said Letters Patent is hereby corrected as shown below:

On the title page:

Insert item 73-Assignee as follows:
Column & Beam, Inc.,
Springfield, Massachusetts Signed and Sealed this Twenty-ninth Day of August, 2000

Attest:

Q. TODD DICKINSON

*Attesting Officer*  *Director of Patents and Trademarks*